(12) United States Patent
Suda (10) Patent No.: US 7,431,786 B2
(45) Date of Patent: Oct. 7, 2008

(54) APPARATUS AND METHOD FOR AFFIXING TIRE COMPONENT MEMBER

(75) Inventor: Nobuyuki Suda, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 436 days.

(21) Appl. No.: 10/517,867

(22) PCT Filed: Jun. 13, 2003

(86) PCT No.: PCT/JP03/07581

§ 371 (c)(1),
(2), (4) Date: Aug. 24, 2005

(87) PCT Pub. No.: WO03/106152

PCT Pub. Date: Dec. 24, 2003

(65) Prior Publication Data

US 2006/0011285 A1   Jan. 19, 2006

(30) Foreign Application Priority Data

Jun. 18, 2002   (JP) .............................. 2002-176712

(51) Int. Cl.
*B29D 30/30* (2006.01)

(52) U.S. Cl. ........................ 156/117; 156/123; 156/264; 156/397; 156/405.1

(58) Field of Classification Search ................. 156/117, 156/123, 134, 264, 265, 397, 405.1, 406.4, 156/906, 907
See application file for complete search history.

(56) References Cited

U.S. PATENT DOCUMENTS

| 3,826,297 | A | | 7/1974 | Alderfer |
| 5,328,532 | A | | 7/1994 | Azuma et al. |
| 6,702,913 | B2 | * | 3/2004 | Marchini et al. ............ 156/117 |
| 7,041,185 | B2 | * | 5/2006 | Caretta et al. ............... 156/117 |

FOREIGN PATENT DOCUMENTS

| EP | 492 918 A2 | 7/1992 |
| JP | 49-76978 A | 7/1974 |
| JP | 4-226742 A | 8/1992 |
| JP | 2002-307520 A | 10/2002 |
| WO | WO 02/55289 A1 | 7/2002 |

\* cited by examiner

*Primary Examiner*—Geoffrey L Knable
(74) *Attorney, Agent, or Firm*—Sughrue Mion, PLLC (57) ABSTRACT

In an apparatus for affixing a tire component member, a capacity of a driving means for a traveling head is decreased, and start end positions of affixing the tire component member are aligned in a peripheral direction of a drum and a widthwise overlap amount between the tire component members is made constant as is expected, and also a cycle time is shortened, in which the apparatus comprises a traveling head 2 moving forward and rearward in an axial direction of a drum 1, a clamp means 9 pushing a front end portion of the tire component member 3 protruded ahead from the traveling head 2 onto the peripheral face of the drum, a cutting means 12 arranged at one end side of the drum apart from the clamp means 9, guide rolls 5 arranged on the traveling head 2 and specifying a widthwise position of the tire component member 3, and a chuck means pulling the tire component member 3 to the clamp means 9.

13 Claims, 7 Drawing Sheets

APPARATUS AND METHOD FOR AFFIXING TIRE COMPONENT MEMBER

TECHNICAL FIELD

This invention relates to an apparatus and a method for affixing a tire component member, which are suitable for forming a shaping material such as a carcass band, an innerliner or the like by affixing a band-shaped tire component member containing cords or no cord and having a given width on a surface of a drum at a state of extending in an axial direction of the drum within a given inclination angle range.

BACKGROUND ART

Figure 7:
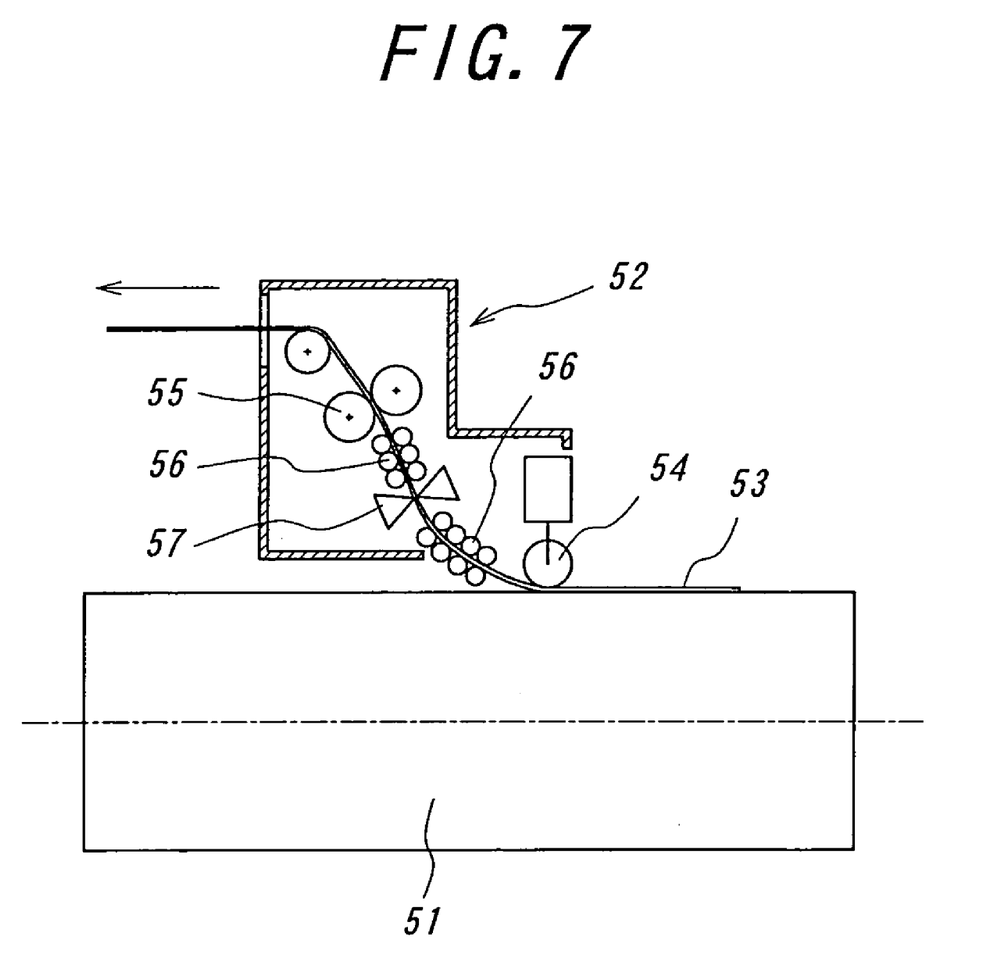
FIG. 7 is a schematically side view partly shown in section of a main part in the conventional apparatus.

As this type of the apparatus conventionally used in the formation of a shaping material such as carcass band or the like, there is an apparatus as shown by a schematic side view partly shown in section of FIG. 7, in which a traveling head 52 is arranged on an outer peripheral side of a drum 51 made of a rigid material so as to move forward and rearward in an axial direction of the drum 51, and in the traveling head 52 are arranged a push roll 54 pushing a tire component member supplied into the traveling head 52, for example, a band-shaped member 53 formed by coating plural cords arranged side by side with rubber, onto the peripheral face of the drum and nip rolls 56 acting to supply the band-shaped member 53, respectively, while plural guide rolls 56 guiding the supply of the band-shaped member 53 while controlling the widthwise position thereof and a cutter positioned between two groups of the guide rolls are arranged therein, respectively.

Figure 8:
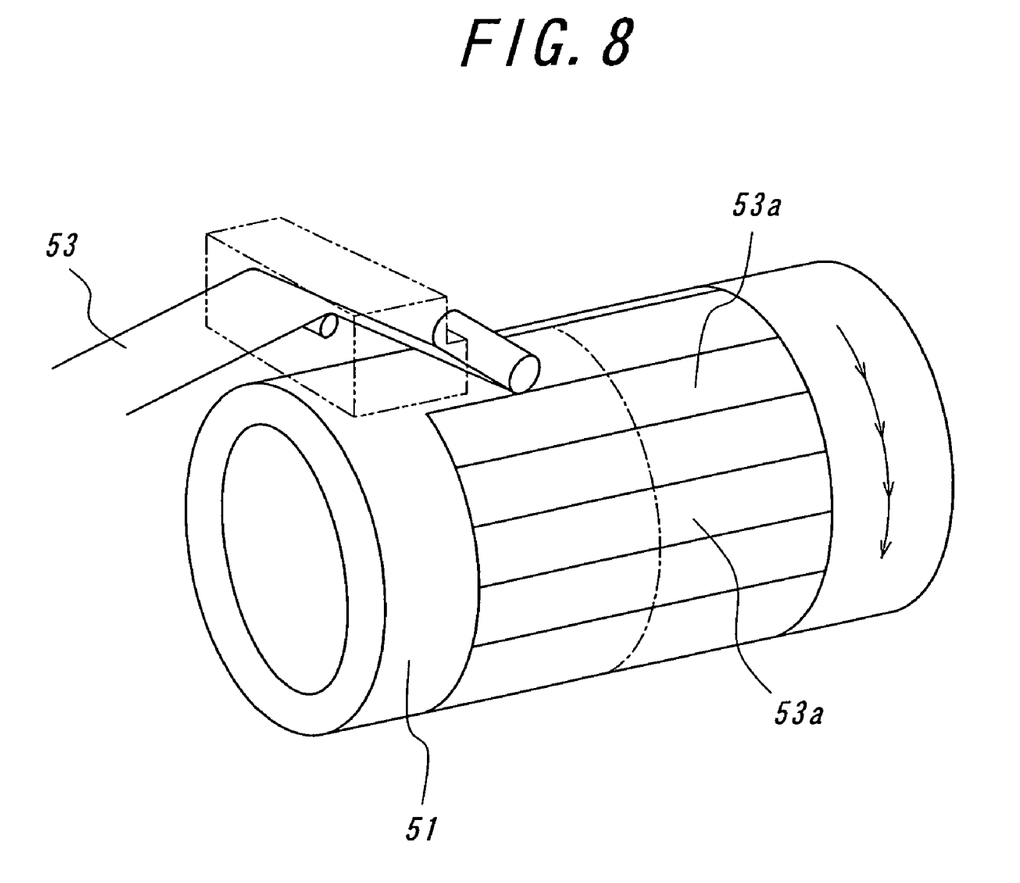
FIG. 8 is a schematically perspective view illustrating an affixing operation in the conventional apparatus.

In the affixing of the band-shaped member 53 on the peripheral face of the drum 53 according to such an apparatus, a front end portion of the band-shaped member 53 supplied to a position of the push roll 54 or ahead thereof under an action of the nip rolls 55 is pressed onto the peripheral face of the drum in the vicinity of one end of the drum 51 through the push roll 54, while the band-shaped member 53 is affixed on the peripheral face of the drum in a linear form based on the rearward displacement of the traveling head 52 while being pushed by the push roll 54 as schematically shown in FIG. 8. When the affixing position arrives at a given position in the axial direction, the band-shaped member 53 is cut by the cutter 57 under the stop of the traveling head 52, and then the cut end portion is pressed up to the vicinity of the other end of the drum 51 through the push roll 54 under the continuation of the rearward displacement of the traveling head 52 to conduct the affixing of one cut material 53a thereon.

Thereafter, the drum 51 is turned by a distance over a rotating angle range corresponding to the width of the band-shaped member 53, while a front end portion of the band-shaped member 53 after the cutting through the cutter 57 is supplied through the nip rolls 55 in the same manner as previously mentioned and such a front end portion of the band-shaped member 53 is pressed on the peripheral face of the drum through the push roll 54 under a forward displacement of the traveling head 52 as mentioned above, and subsequently the affixing of next cut material 53a is carried out in the same manner as mentioned above. These operations are successively repeated with the turning movement of the drum 51 to affix the cut materials 53a on the peripheral face of the drum over a full periphery with no space, whereby a shaping material such as a carcass band or the like having a given peripheral length is formed.

Thereafter, the thus formed carcass band shaping material is taken out from the drum and affixed on a carcass band shaping drum not shown over a full periphery to form a carcass band of substantially a cylindrical form as a whole.

In the conventional technique, however, there is a problem that since the nip rolls 55, the cutter 57 and the like are incorporated into the traveling head 52, the weight of the head becomes heavier and a driving motor or the like having a large capacity is required for moving the traveling head 52 forward and rearward at a high speed. Also, slippage is caused between the nip rolls 55 and the band-shaped member 53 when the traveling head 52 is moved forward and rearward at a high speed. When the front end of the band-shaped member 53 is contacted with the guide rolls 56 or the like, the supplying amount of the band-shaped member 53 is changed under the action of the nip rolls 55 for a given time and hence the start end position in the pressing of the band-shaped member 53 is changed in the peripheral direction of the drum 51 under constant forward and rearward strokes of the traveling head 52. Furthermore, according to the conventional technique, the widthwise position of the band-shaped member 53 supplied ahead from the guide rolls 56 or the extending posture of the band-shaped member 53 in the widthwise direction can not be specified sufficiently, so that when the cut materials 53a are partly overlapped with each other in the widthwise direction in the affixing, the scattering of the overlap amount is easily caused, which is a cause of lowering the tire quality. Further, the rearward displacement of the traveling head 52 is required to be temporally stopped in the course of the affixing step for cutting the band-shaped member. Moreover, the supplying operation of the front end portion of the band-shaped member 53 through the start of the affixing step is unavoidable, so that the cycle time becomes undesirably longer.

The invention is to solve the above problems of the conventional technique and to provide an apparatus and a method for affixing a tire component member wherein the capacity of the driving means for the traveling head can be made sufficiently small, and each of start and terminal positions in the affixing of the tire component member on the drum can be located in the peripheral direction of the drum at substantially a constant position in the axial direction thereof and the overlap amount of the tire component member on the drum can be rendered into a constant amount as it is expected, and further the affixing of the tire component member can be carried out in a short cycle time without stopping the movement of the traveling head and without requiring the preliminary supplying operation of the front end portion of the tire component member.

DISCLOSURE OF THE INVENTION

The apparatus for affixing a tire component member according to the invention lies in that a band-shaped tire component member having a given width is affixed on a peripheral face of a rotatable drum made of a rigid material at a given length range and over a given angle range, and is characterized in that a traveling head moving forward and rearward in an axial direction of a drum is arranged at an outer peripheral side of a drum, and a clamp means is independently arranged from the traveling head for pushing a front end portion of a tire component member protruded ahead from the traveling head on the peripheral face of the drum at a forward moving state of the traveling head, and a cutting means for the tire component member is arranged at one end side of the drum separated away from the clamp means, and a guide means specifying a widthwise position of the tire component member and a chuck means pulling out the tire component member to the clamp means under a forward displacement of the traveling head are arranged in the traveling head.

When the tire component member is affixed on the peripheral face of the drum through the above apparatus, the tire component member located at a cut state by the cutting means and protruded somewhat ahead from the push means of the traveling head is first pulled out to the position of the clamp means based on the forward displacement of the traveling head under the action of the chuck means and the front end portion of the tire component member is pressed onto the peripheral face of the drum by the clamp means while specifying the widthwise position of the tire component member based on the action of the guide means, and then the tire component member is linearly extended and affixed on the peripheral face of the drum by the releasing of the chuck means and the rearward displacement of the traveling head. This operation is continued until the tire component member arrives at the end of the drum separated away from the clamp means to complete the affixing of the tire component member to such an end through the push means, and thereafter the tire component member is preferably cut at a position extremely near to the edge of the drum by means of the cutting means.

In this case, the cutting is carried out so as to make a state that the front end portion of the tire component member is protruded somewhat ahead from the traveling head, so that the tire component member is successively and repeatedly affixed on the peripheral face of the drum as mentioned above while turning the drum over a given angle range, whereby the tire component member can be accurately affixed on the peripheral face of the drum over the given angle range and within a given length range in the axial direction irrespectively of the inclusion of cords.

Thus, the protruding amount of the front end portion of the tire component member from the traveling head is always constant under a relationship between a rearward stroke limit position of the traveling head and an acting position of the cutting means, so that the front end portions of the tire component member pressed on the peripheral face of the drum by the clamp means at a forward stroke limit position of the traveling head are aligned at their front end positions in the peripheral direction of the drum in a high precision.

Also, the rear end portion of the tire component member is always cut at a constant position by the cutting means arranged at the one end side of the drum, so that the read end positions are also aligned in the peripheral direction of the drum in a high precision.

In the invention, the fear of lowering the tire quality due to the irregular front end positions of the tire component members can be removed sufficiently.

According to the invention, the protruding amount of the front end portion of the tire component member from the traveling head can be rendered into an amount capable of specifying the widthwise position of the front end portion through the guide means, so that when the front end portions is pressed on the drum through the clamp means, the widthwise position of the front end portion can be controlled as is expected, and hence the widthwise overlap amount of the tire component members adjoining to each other in the peripheral direction of the drum can be made a given constant amount in a higher precision.

In the invention, therefore, the fear of lowering the tire quality due to the irregular widthwise overlap amount of the tire component member in the peripheral direction of the drum can be removed.

Furthermore, according to the invention, it is not necessary to stop the rearward displacement of the traveling head until the completion of once affixing of the tire component member, and also it is not necessary to preliminarily supply the front end portion of the tire component member prior to the start of the affixing step, so that the affixing cycle time of the tire component member can be advantageously shortened.

In the apparatus of the invention, the cutting means is separated from the traveling head and the nip rolls are removed off to make the traveling head itself small size and light weight, whereby the traveling head can be moved forward and rearward at a faster speed by means of a small capacity driving means and also a space occupied for the forward and rearward movement can be made sufficiently small.

In such an apparatus, it is preferable to arrange means for applying tension to the tire component member. Thus, a given tension, for example, a tension of 15-20 N per the tire component member of about 80 mm in width can be always applied to the tire component member over a period ranging from a pulling step of the tire component member to the completion of the affixing step, whereby the affixing of the tire component member can be surely guaranteed.

When at least the chuck means is made possible to displace near to a center axial line of the drum, after the completion of one tire component member on the peripheral face of the drum, the chuck means is displaced toward the direction of the center axial line of the drum, whereby the tire component member held by the chuck means can be affixed more sufficiently and surely up to an axial end position of the drum.

Further, when a pushing means capable of pushing the tire component member onto the peripheral face of the drum accompanied with the rearward displacement of the traveling head such as a roller having a hand drum-shaped peripheral face form corresponding to the profile form of the peripheral face of the drum or the like is arranged on the traveling head, this pushing means is acted with the progress of the affixing step of the tire component member based on the rearward displacement of the traveling head, whereby the tire component member can be more surely affixed on the peripheral face of the drum over a whole of the tire component member in widthwise and longitudinal directions thereof.

In the above apparatus, it is more preferable to arrange a guide rail supporting the traveling head and guiding the forward and rearward displacement thereof. Thus, the forward and rearward displacement of the traveling head can be carried out in a high accuracy as is expected.

The cutting means may be constructed with a fixed shear blade arranged over a full periphery of an end of the drum and a movable shear blade located in correspondence to the fixed shear blade but also may be a rotational cutting blade or an ultra-sonic vibration cutting blade.

When the cutting means is constructed with the fixed shear blade and the movable shear blade, the tire component member can be precisely cut at one end edge position of the drum. In case of the rotational cutting blade, the tire component member can be cut at an expected position. In case of the ultra-sonic vibration cutting blade, it is not required to contact blades as compared with the case of using a pair of shear blades, so that the service life of the cutting means can be prolonged.

When the affixing means pushing a side portion of the tire component member affixed on the peripheral face of the drum onto the peripheral face of the drum or the adjoining tire component member over a full length of the tire component member is arranged independently from, for example, the traveling head, it is acted in synchronism with the progress of the affixing step of the tire component member or independently from the affixing step, whereby the required affixing of the side portion of the tire component member can be always conducted surely.

Also, the method of affixing the tire component member according to the invention using the above affixing apparatus lies in that a band-shaped tire component member having a given width is affixed in an axial direction of a drum while pushing a front end portion of the tire component member onto a peripheral face of the drum by means of a clamp means, and after the completion of one affixing, the tire component member is cut at a position corresponding to an axis end of the drum, and then a front end portion of a next tire component member is pulled out to a position of the clamp means through a forward displacement of a traveling head while turning the drum over an angle range corresponding to the width of the tire component member, and thereafter these operations are repeated.

In this case, the tire component member can be affixed on the drum so as to overlap at a given amount in the widthwise direction, and also the affixing number of the tire component member having a constant width can be changed in accordance with a designation of a rim size for the tire under an increase or a decrease of an affixing angle range on the peripheral face of the drum.

According to the latter case, when the width of the tire component member is previously selected, the tire component member can sufficiently cope with the change of a tire size only by changing the affixing number of the tire component member having the same width.

In this way, the tire component member is affixed onto the peripheral face of the drum under the selection of the affixing number over a given angle range to form a shaping material for a green tire having a peripheral length as is expected, and thereafter the shaping material is affixed on a shaping drum having a required outer diameter through a transcription or the like to shape into an innerliner, a carcass band or the like having a cylindrical form as a whole.

In this method, the front end portion of the tire component member is pulled out to the position of the clamp means under an action of tension to the tire component member and made delivery to the clamp means, whereby the tire component member subjected to the tensile force can be affixed on the peripheral face of the drum smoothly and surely.

In case of affixing the tire component member onto the peripheral face of the drum, after the completion of one affixing step of the tire component member and before the start of the cutting step, the affixed rear end of the tire component member is closely adhered to the peripheral face of the drum, for example, by displacing the rear end portion toward a direction of a center axial line of the drum, whereby the tire component member can be more sufficiently affixed onto the peripheral face of the drum over a full length ranging from the front end to the rear end.

BEST MODE FOR CARRYING OUT THE INVENTION

Figure 1:
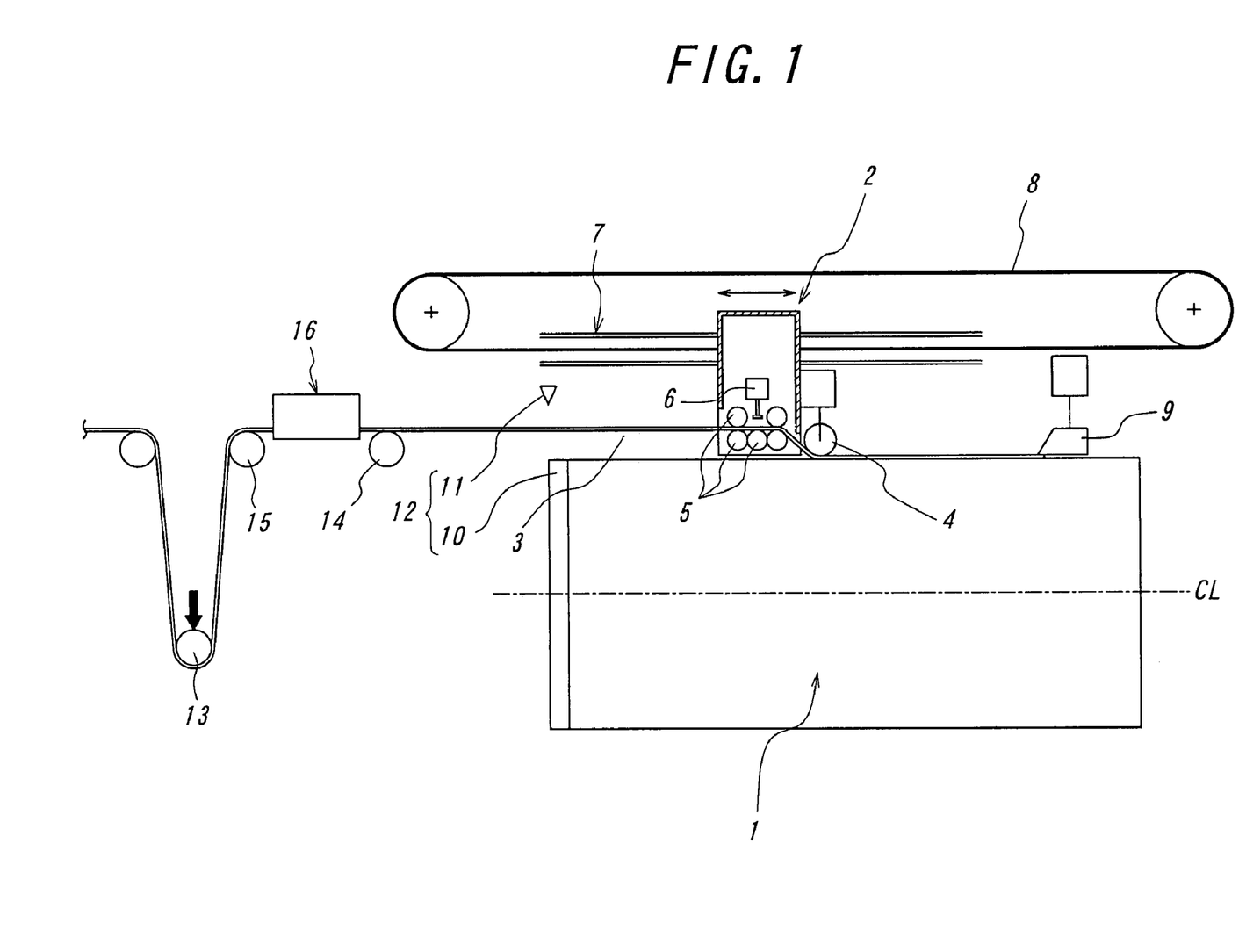
FIG. 1 is a schematically side view partly shown in section of an embodiment of the apparatus according to the invention.

In FIG. 1 is shown an embodiment of the apparatus according to the invention, wherein numeral 1 is the same drum as described in the conventional technique. This drum 1 can turn around a center axial line CL thereof every a given angle range.

Numeral 2 is a traveling head moved forward and rearward at an outer peripheral side of the drum 1 in the axial line direction thereof. The traveling head 2 is provided with a pushing roll 4 pushing and affixing a band-shaped tire component member 3 having a given width onto the peripheral face of the drum as an example of a pushing means, preferably a roll having a peripheral face corresponding to an outer profile line of the peripheral face of the drum, and plural guide rolls 5 contacting with upper and lower faces and both side faces of the tire component member 3 to specify positions of the tire component member 3 in up-down directions and widthwise direction thereof as an example of a guide means.

Moreover, the pushing roll 4 may be replaced with a plate-shaped elastic plate, a brush or the like for the purpose of reducing a thickness of the roll itself in the axial line direction of the drum 1. As the case may be, they may be omitted to attain more miniaturization and weight reduction of the traveling head 2.

In this embodiment, a clamp cylinder 6 is arranged between the guide rolls 5 located at an upper side of the figure. A chuck means contributing to pull out the tire component member 3 is constructed by the clamp cylinder 6 and one or plural guide rolls 5 located at a lower side of the figure and sandwiching the tire component member 3 with the cooperation of the cylinder.

Such a traveling head 2 is supported by a guide rail 7 arranged in parallel to the axial line of the drum. Also, the forward and rearward displacement of the traveling head 2 is guided by the guide rail 7.

The forward and rearward movement of the traveling head 2 can be carried out by connecting the traveling head 2 to, for example, a timing belt 8 driven by a motor to move between given forward limit position and rearward limit position. Also, the forward and rearward movement can be carried out by the action of cylinder, ball screw, gear and the like directly connected to the traveling head 2 instead of the above case.

Further, a clamp means 9 pushing a front end portion of the tire component member 3 onto a peripheral face of the drum is arranged at a given position in the axial line direction of the drum 1 in the vicinity of the forward limit position of the traveling head 2 independently from the traveling head 2. Also, a cutting means 12 consisting of a fixed shear blade 10 arranged over a full peripheral of the drum 1 and a movable shear blade 11 shearing the tire component member 3 together with the fixed shear blade 10 is arranged at one end side of the drum 1 separated apart from the clamp means 9 independently from the traveling head 2.

Moreover, the clamp means 9 can be naturally arranged so as to change the position in the axial line direction of the drum, if necessary.

Figure 2:
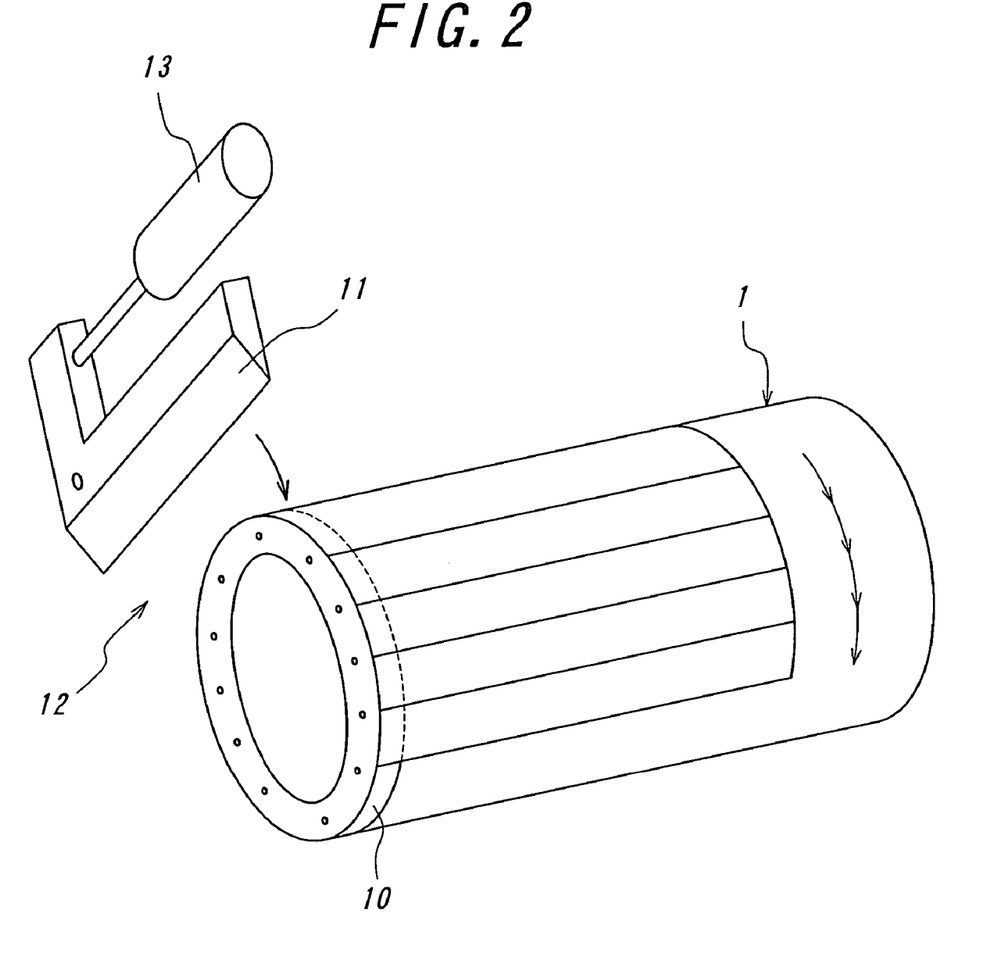
FIG. 2 is a schematically perspective view illustrating a cutting means.

In such a cutting means 12, the movable shear blade 11 is a reciprocating blade moving forward and rearward in a direction perpendicular to the axial line of the drum, or may be a swing blade having substantially a hook shape as a whole and swinging, for example, by a cylinder as shown by a schematically perspective view in FIG. 2.

Alternatively, the cutting means may be constructed with a rotational cutting blade or an ultra-sonic vibration cutting blade arranged near to an end of the axis of the drum.

In the above embodiment, it is preferable that the upside and downside guide rolls 5 contacting with the tire component member 3 from up-down directions give a form along a cross-sectional profile line of the peripheral face of the drum to the tire component member 3 passing through the guide rolls for enhancing the certainty of affixing the tire component member 3 to the peripheral face of the drum 1. For this end, as shown by a schematically front view in FIG. 3(a), it is preferable that at least lower side guide rolls 5 are rendered into a fold form bending at plural places in the axial line direction in the form approximated to the cross-sectional profile line to thereby assist the forming deformation of the tire component member 3 based on its dead weight.

Figure 3:
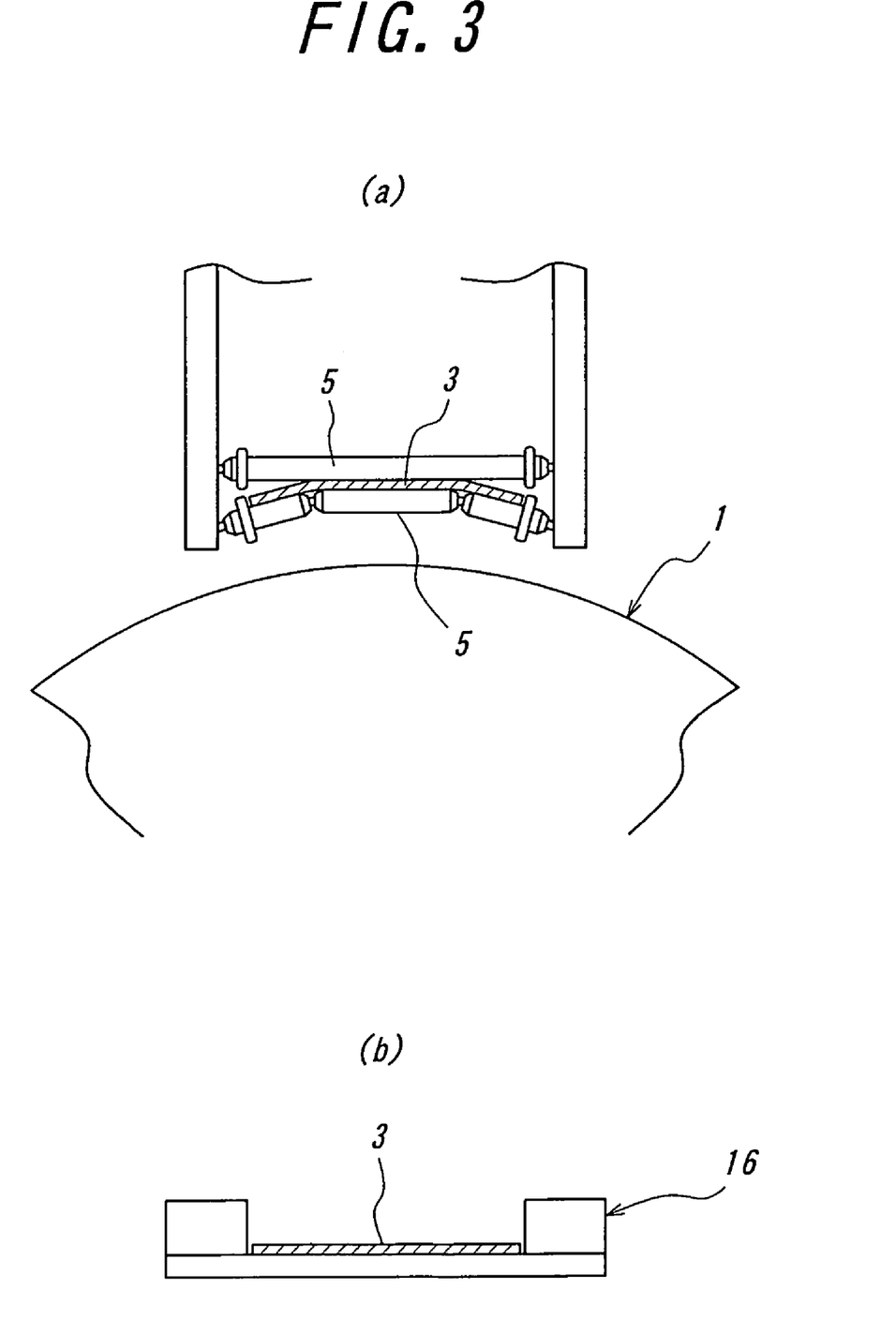
FIG. 3 is a schematically front view illustrating a guide roll and a positioning means.

In the upside and downside guide rolls 5 of the illustrated embodiment, each flange formed on axial end portions of these rolls functions to specify each widthwise position of the tire component member 3.

At this position, it is preferable that one of the plural guide rolls guiding the arrival of the tire component member 3 to the traveling head 2, a guide roll 13 in FIG. 1 is energized toward a down side of the figure to function as a tension applying means generating a required tension to the tire component member 3 wrapped therearound. In this case, a tension to the tire component member 3 may be about 15-20 N, for example, when the width is about 80 mm.

Preferably, as shown by a schematically front view in FIG. 3(b), a channel-shaped positioning means 16 regulating both side edge positions of the tire component member 3 is arranged between two guide rolls 14, 15 arranged at a position in the vicinity of the drum 1 or nearest to the drum 1 in the figure for enabling the widthwise positioning of the tire component member 3 fed to the traveling head 2.

When the tire component member is affixed onto the peripheral face of the drum within a given length range in the axial line direction of the drum over a given angle range by using the affixing apparatus having the above construction, as shown by a section view of a main part in FIG. 4(a), a tire component member 3 cut by a cutting means at one end side of a drum 1 is held by a chuck means at a state of protruding a front end portion somewhat ahead from a push roll 4, and a traveling head 2 is displaced forward to a given forward limit position as shown in FIG. 4(b) to pull out a given amount of the tire component member 3. Then, the front end portion of the tire component member 3 is pushed onto a peripheral face of the drum by means of a clamp means 9 at the above position of the traveling head 2, for example, under an action of a given tension to the tire component member 3, and thereafter a linear affixing of the tire component member 3 to the peripheral face of the drum is carried out by releasing the chuck means and straightforward displacing rearward the traveling head 2 in an axial line direction of the drum under a forward displacement of a push roll 4 as shown in FIG. 4(c) to thereby continuously affix the tire component member 3 up to the above one ed of the drum through the traveling head, directly the push roll 4. Then, as shown in FIG. 4(d), the push roll 4 is separated away from the one end of the drum by a given small distance, e.g. 40 mm to stop the rearward displacement of the traveling head 2, while the chuck means is actuated and subsequently the cutting means 12, a shear cutting blade in the illustrated embodiment is operated to cut the tire component member 3 just at an edge position of the drum, whereby a first affixing of the tire component member 3 is terminated.

Thereafter, the drum 1 is turned over an angle range corresponding to a width of the tire component member 3, and the aforementioned operations are successively repeated since then.

FIG. 2 shows a case that the tire component member 3 having a given width is affixed plural times by the above method. By conducting this treatment on the peripheral face of the drum over given angle range is completed the formation of a shaping material such as a carcass band, an innerliner or the like.

In the above affixing of the tire component member, when the size of the width is properly selected, as previously mentioned, the tire component member can sufficiently cope with the change of a designation of a rim size of a product tire only by changing the affixing number under the increase or decrease of the affixing angle range on the peripheral face of the drum.

For example, when the tire component member is a band-shaped member for a carcass shaping material and a width of the band-shaped material is 76.9 mm, if the band-shaped materials are affixed by overlapping them with each other at only a width corresponding to one cord embedded therein, a shaping material for a carcass band having a designed peripheral length can be formed by affixing 17 cut parts of the band-shaped material when a designation of a rim size is 17 inches or 18 parts thereof when a designation of a rim size is 18 inches. Also, even if the band-shaped material is used in other tires having various designations of rim size, excess or deficiency of the width size is not caused and the lowering of uniformity in the product tire is not caused.

According to the affixing apparatus, as mentioned above, the nip roll 55, cutter 57 and the like used in the conventional technique are particularly removed from the traveling head to realize the miniaturization and weight reduction of the traveling head, so that a driving means for the traveling head can be made small in the capacity.

In the cutting of the tire component member 3, a length of the front end portion protruding ahead from the push roll 4 is made 40 mm or other constant length, whereby a start position of the tire component member 3 to be affixed onto the outer peripheral face of the drum can be aligned in the peripheral direction of the drum at a higher accuracy. Also, the affixing position of the front end portion can be accurately controlled by specifying the widthwise position of the front end portion by the guide roll 5 under a short protruding length thereof. As a result, the widthwise overlapping amount between the mutually adjoining affixed tire component members 3 can be always made to a given constant amount.

In this embodiment, it is not required to interrupt the rearward displacement of the traveling head 2 over a period from the start of affixing the tire component member 3 to the end thereof and the previously pulling-out operation of the front end portion of the tire component member 3 is useless prior to the start of the affixing step, so that the cycle time of the affixing step can be shortened to largely improve the operation efficiency.

In case of affixing the tire component member 3 onto the peripheral face of the drum 1 over a given angle range as mentioned above, in order to more properly and surely conduct the affixing of each side portion of the tire component member 3 onto the peripheral face of the drum or onto the adjoining tire component member, it is preferable that an affixing means for conducting the correction of the form in the side portion of the tire component member and the pushing of the side portion while moving in the axial line direction of the drum 1 is integrally united with the traveling head 2 or arranged independently therefrom.

Figure 5:
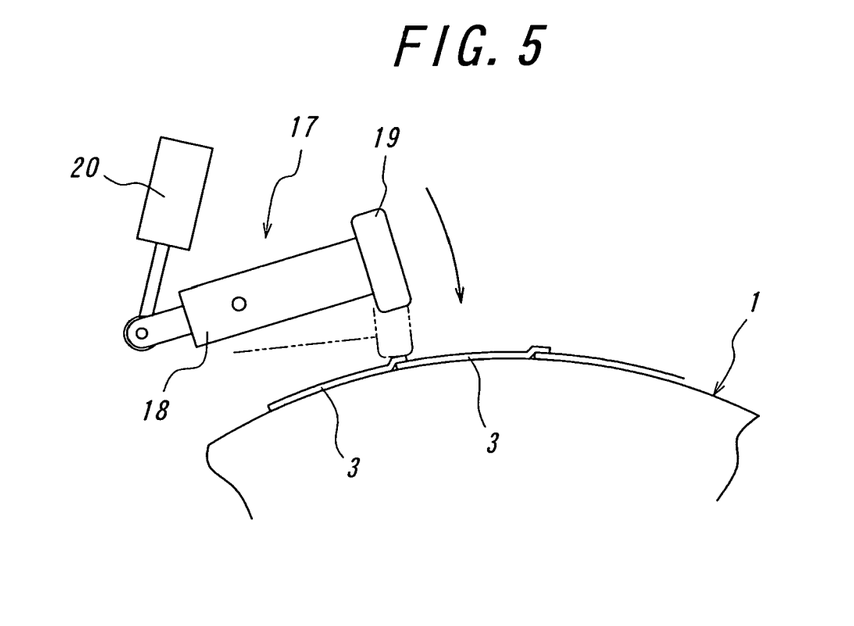
FIG. 5 is a schematically front view illustrating an affixing means.

FIG. 5 is a schematically front view illustrating the affixing means arranged independently from the traveling head 2. This affixing means 17 is constructed by rotatably attaching a roller 19 such as silicone rubber roller or the like to an end of a swing bracket 18 around an axial line extending in a direction perpendicular to an extending direction of the tire component member 3 affixed onto the peripheral face of the drum and connecting the other end of the swing bracket 18 to a hinge of a cylinder 20 bringing about the swing movement of this bracket 18 and moving them as a whole forward and rearward in the axial line direction of the drum 1, if necessary.

According to this affixing means 17, the roller 19 is displaced downward to a position shown by a phantom line in the figure under the action of the cylinder 20, at where the side portion of the tire component member 3 on the peripheral face of the drum is pressed over a given width corresponding to a length of the roller, while the roller 19 is rotated over a distance corresponding to an affixed length of the tire component member 3, whereby the affixing of the side portion of the tire component member 3 can be realized as is expected.

Figure 4:
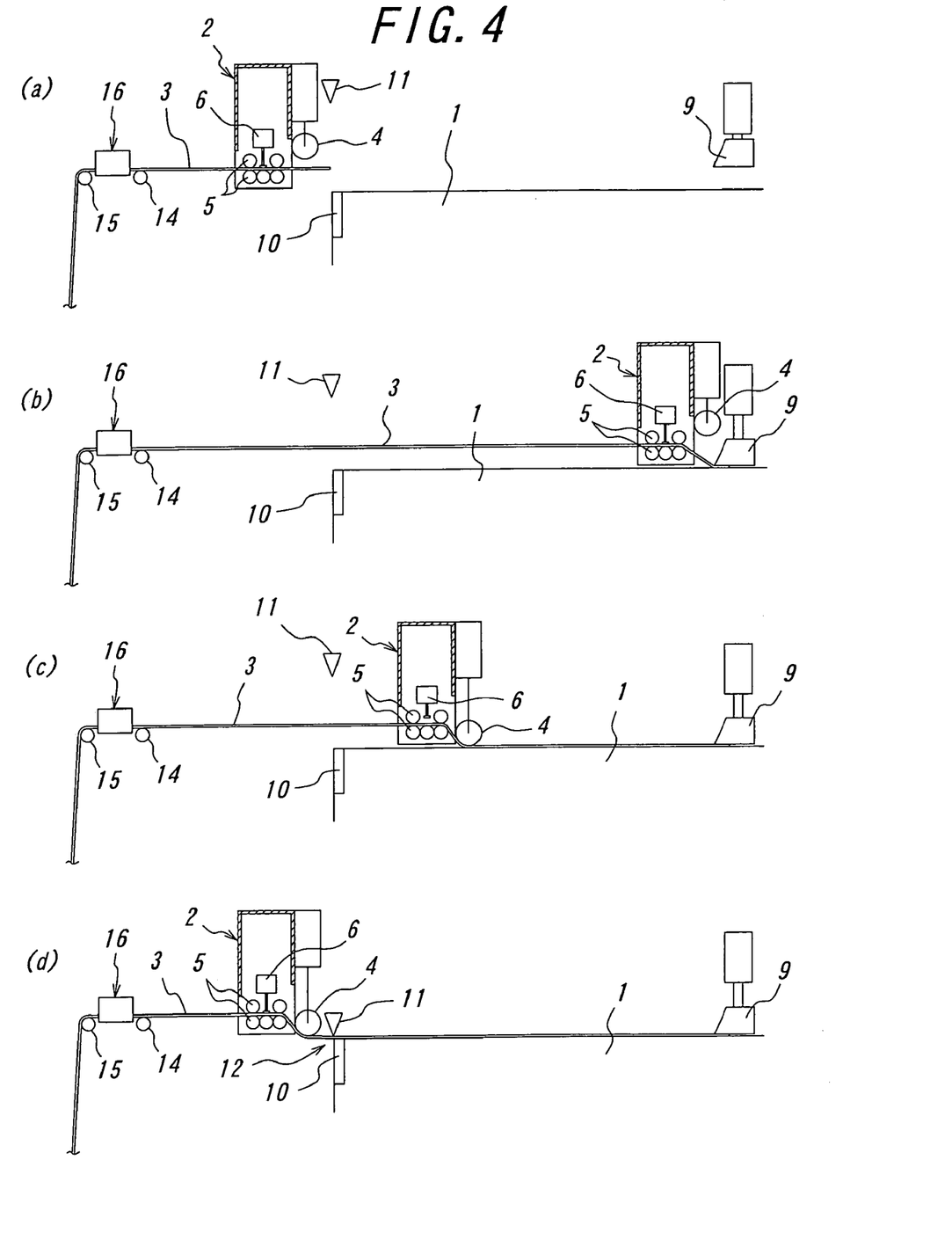
FIG. 4 is a schematic view partly shown in section of a main part in an affixing step of a tire component member.
Figure 6:
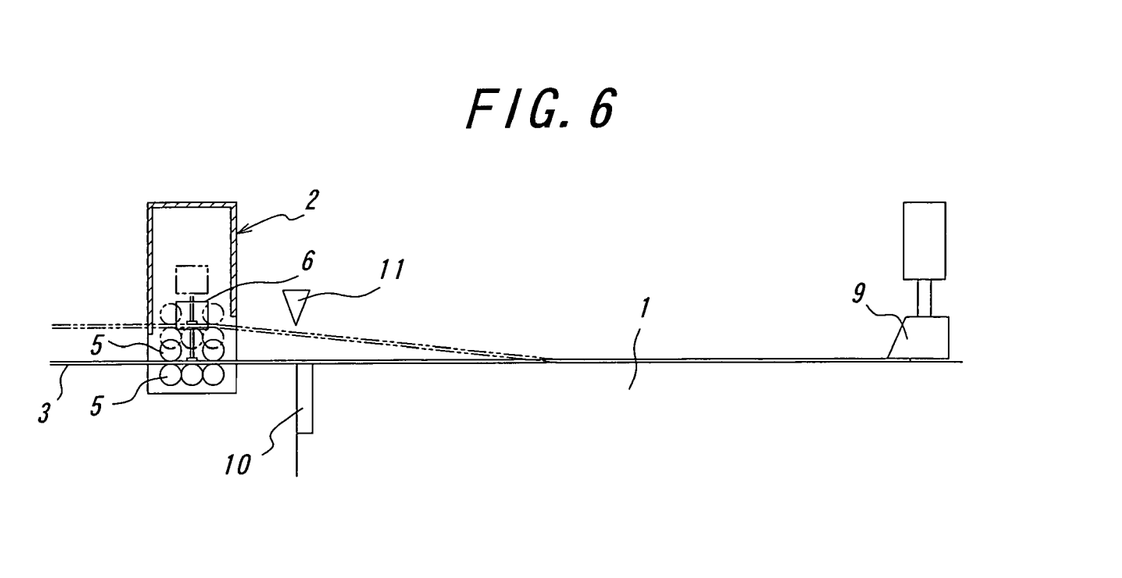
FIG. 6 is a schematic view illustrating a final affixing step of a tire component member in another embodiment of the apparatus according to the invention.

Although the action of the apparatus according to the invention is described with reference to the case of FIG. 4, if the required affixing of the tire component member 3 is carried out by using the affixing apparatus omitting the attachment of the push roll 4 to the traveling head 2, the affixing of the tire component member 3 under the action of the push roll 4 as shown in FIG. 4(c) can not be conducted. In this case, the chuck means including at least plural guide rolls 5, preferably the whole of the traveling head 2 can be displace near to the center axial line of the drum 1. According to the latter case, after the traveling head 2 is displaced rearward to a position separated from one end of the drum 1 at a given distance, the whole of the traveling head 2 is displaced by a given amount in the center axial line direction of the drum 1 as shown in FIG. 6, e.g. toward a downside in the figure while clamping the tire component member 3 with the chuck means, whereby the tire component member 3 on the peripheral face of the drum preferably under an action of tension can be affixed onto the peripheral face of the drum over the full length as is expected.

INDUSTRIAL APPLICABILITY

According to the invention, therefore, the capacity of the driving means for the traveling head and the driving space can be made sufficiently small, and also the start end position and terminal end position of affixing the tire component member onto the drum can be made to substantially constant positions in the axial line direction of the drum at the peripheral direction thereof, while the overlap amount of the tire component members on the drum can be made constant as is expected and the affixing of the tire component member can be carried out in a short cycle time without requiring the previously pulling-out operation of the front end portion of the tire component member.

Furthermore, the cut end of the tire component member cut by the cutting means arranged near to the axis end of the drum is pull out as it is and affixed onto the drum, whereby a starting material having a high dimensional accuracy and a high quality after the affixing can be formed.

The invention claimed is:

1. An apparatus for affixing a tire component member in which a band-shaped tire component member having a given width is affixed on a peripheral face of a rotatable drum made of a rigid material at a given length range and over a given angle range, wherein a traveling head moving forward and rearward in an axial direction of the drum is arranged at an outer peripheral side of the drum, and a clamp is independently arranged from the traveling head for pushing a front end portion of a tire component member protruded ahead from the traveling head on the peripheral face of the drum at a forward moving state of the traveling head, and a cutter which cuts the tire component member that is on the drum is arranged at one end side of the drum separated away from the clamp relative to the axial direction of the drum, and a guide specifying a widthwise position of the tire component member and a chuck pulling out the tire component member to the clamp under a forward displacement of the traveling head are arranged in the traveling head.

2. An apparatus for affixing a tire component member according to claim 1, which further comprises a tensioner which applies a tension to the tire component member.

3. An apparatus for affixing a tire component member according to claim 1, wherein at least the chuck is disposed to be displaced to a position near a center axial line of the drum.

4. An apparatus for affixing a tire component member according to claim 1, wherein a pusher capable of pushing the tire component member onto the peripheral face of the drum accompanied with the rearward displacement of the traveling head is arranged on the traveling head.

5. An apparatus for affixing a tire component member according to claim 1, which further comprises a guide rail supporting the traveling head and guiding the forward and rearward displacement thereof.

6. An apparatus for affixing a tire component member according to claim 1, wherein the cutter is constructed with a fixed shear blade arranged over a full periphery of an end of the drum and a movable shear blade located in correspondence to the fixed shear blade.

7. An apparatus for affixing a tire component member according to claim 1, wherein the cutter is a rotational cutting blade or an ultra-sonic vibration cutting blade.

8. An apparatus for affixing a tire component member according to claim 1, which further comprises an affixer which pushes a side portion of the tire component member affixed on the peripheral face of the drum onto the peripheral face of the drum or the adjoining tire component member over a full length of the tire component member.

9. A method of affixing a tire component member using an apparatus as claimed in claim 1, wherein the tire component member is affixed in the axial direction of the drum while pushing the front end portion of the tire component member onto the peripheral face of the drum by the clamp, and after the completion of one affixing, the tire component member is cut at a position corresponding to an axial end of the drum, and then a front end portion of a next tire component member is pulled out to a position of the clamp through a forward displacement of the traveling head while turning the drum over an angle range corresponding to the width of the tire component member, and thereafter these operations are repeated.

10. A method of affixing a tire component member according to claim 9, wherein the tire component member is affixed on the drum so as to overlap at a given amount in the widthwise direction.

11. A method of affixing a tire component member according to claim 9, wherein the affixing number of the tire component member having a constant width is changed in accordance with a designation of a rim size for the tire.

12. A method of affixing a tire component member according to claim 9, wherein the front end portion of the tire component member is pulled out to the position of the clamp.

13. A method of affixing a tire component member according to claim 9, wherein the tire component member is affixed onto the peripheral face of the drum, after the completion of one affixing step of the tire component member and before the start of the cutting step, the affixed rear end of the tire component member is closely adhered to the peripheral face of the drum.

* * * * *